April 1, 1969 W. L. SHOCKLEY 3,436,327

SELECTIVE SPUTTERING RATE CIRCUIT FORMING PROCESS

Filed July 18, 1966

INVENTOR.
WILLIAM L. SHOCKLEY

BY Moody and Kintzinger
ATTORNEYS

United States Patent Office 3,436,327
Patented Apr. 1, 1969

3,436,327
SELECTIVE SPUTTERING RATE CIRCUIT FORMING PROCESS

William L. Shockley, Richardson, Tex., assignor to Collins Radio Company, Cedar Rapids, Iowa, a corporation of Iowa Filed July 18, 1966, Ser. No. 565,928
Int. Cl. C23c 15/00
U.S. Cl. 204—192 3 Claims This invention relates in general to the formation of desired circuit patterns in thin film circuits and, in particular, to a thin film production process utilizing a method of circuit pattern formation based primarily upon selective sputtering rate characteristics of various metals and/or metal oxides. The process provides for selective removal of circuit material according to predetermined patterns by the sputtering process with the circuit buildup being a cathode during the sputter metal removing portion of the process.

Figure 1:
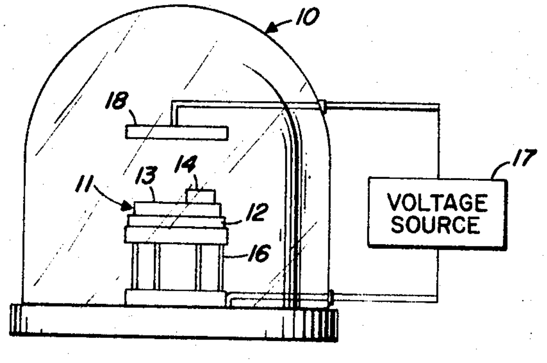

Various thin film circuit pattern forming processes utilizing conventional masking and corrosive etching techniques are, in many instances, involved, time-consuming and expensive, and in some instances present problems in achieving acceptable production quality control and a required level of product quality and uniformity.

It is, therefore, a principal object of this invention to provide a thin film circuit pattern formation process without requiring conventional masking and corrosive etching techniques, or, in some special instances, to minimize requirements for such masking and corrosive etching techniques.

Further objects are to provide a thin film circuit pattern formation process with substantially all thin film pattern formation process steps accomplished in a vacuum station environment, to obtain high levels of quality control, and, to a high degree, product uniformity.

These objects and other beneficial results are accomplished through use of applicant's thin film circuit pattern forming process with selective sputtering removal of metal, from the thin film circuit being formed, consistent with the selective cathode sputtering removal rates of metals and metal oxides. In the process prior to the selective sputtering removal of circuit material in a vacuum station and thereby formation of thin film circuit patterns, a base film such as tantalum is deposited by any of various techniques upon a substrate of suitable characteristics. Portions of the base film deposition are then covered by a semi-insulator, an aluminum oxide, or aluminum which is subsequently subject to an oxidizing process to present a low sputter rate material covering, or a sufficiently thick layer of aluminum, in the non-oxidized form, deposited in a pre-designed desired pattern formation. Then the thin film circuit being processed is treated as a sputtering process cathode for sputtering removal of exposed high rate sputtering material not covered by an electrical insulator or a low sputtering rate material to thereby present, when the sputtering metal removing process is complete, a desired thin film circuit pattern.

A specific embodiment representing what is presently regarded as the best mode for carrying out the invention is illustrated in the accompanying drawings.

Figure 2:
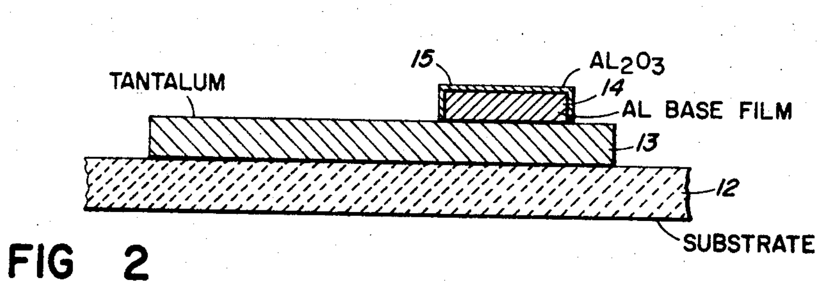
Figure 3:
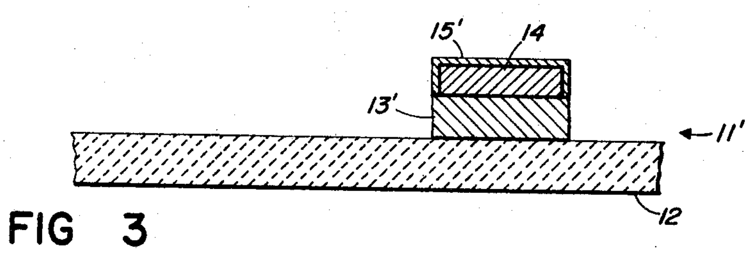
Figure 4:
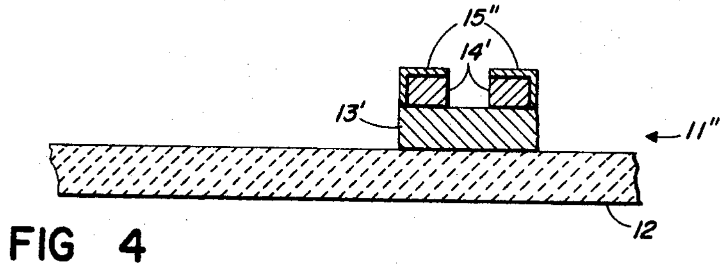

In the drawings:

FIGURE 1 represents a front elevation view of what is known in the trade as a "vacuum station" suitable for various thin film production processes such as sputtering;

FIGURE 2, a cutaway sectioned elevation view of a thin film buildup on a substrate prior to sputtering process patterned removal of metal;

FIGURE 3, the same thin film buildup shown in FIGURE 2 at a later stage after patterned sputter removal of exposed base film metal; and FIGURE 4, a cutaway sectioned elevation view of the same thin film circuit buildup after a subsequent etching process step.

Referring to the drawings:

A vacuum station 10, such as illustrated in FIGURE 1, may be used to produce the thin film circuit buildup 11, shown in section in FIGURE 2. This thin film buildup 11 includes a suitable substrate 12, and a layer of high sputter rate material, such as a thin film deposition of tantalum 13. A sputtering action insulating material, such as a photo-resist material or a relatively low sputtering rate material, is then deposited in accordance with a predetermined desired circuit pattern forming formation over various portions of the previously positioned relatively high sputter rate base film deposition, shown in FIGURE 2 as the tantalum thin film deposition 13. A photo-resist material that may be developed into appropriate protective patterns by photo processing is Kodak photo-resist, a compound of materials in accord with the stated proportions: polyvinyl cinnamate, 2.5 grams; methyl glycol acetate, 100 cubic centimeters; and perinaphthenone sensitizer compound, 0.25 gram. The relatively low sputter rate material pattern deposition on the base film tantalum 13 may be a deposition of aluminum oxide $Al_2O_3$ through an aperture mask by one of various known techniques, or it may be a deposition of aluminum of sufficient thickness through an aperture mask by a sputtered metal deposition process in vacuum chamber 10 or by an aluminum vapor deposition process through an aperture mask according to known techniques. The aluminum film patterned deposition 14 by the latter process may be then exposed to an oxygen rich atmosphere, probably in another chamber, to partially oxidize the aluminum providing an aluminum oxide $Al_2O_3$ low sputter rate surface layer over the aluminum 14 having a much lower sputter rate than aluminum itself.

The circuit buildup, as shown in FIGURE 2, at least up to the deposition of the aluminum 14 may be accomplished as by vapor deposition or by sputtering process deposition of metal in vacuum station 10 with the thin film circuit buildup mounted as an anode on an anode platform 16 and connected to a positive output of DC voltage supply 17, and with sputtering metal source cathode 18 connected to the negative DC output of voltage source 17. If the base film 13 is a tantalum thin film deposited by the sputtering process, a tantalum metal cathode sputtering source 18 is first employed in the vacuum station 10, and then for the later deposition of the aluminum patterned layer 14 by the sputter metal deposition process, cathode 18 is changed to an aluminum sputter metal cathode source. This requires either the switching of the cathodes from one metal cathode to the other metal cathode, or shifting the thin film buildup from one vacuum station 10 to another for successive steps in the circuit buildup.

After the thin film circuit buildup is in the state shown in FIGURE 2, it is positioned in a vacuum station such as the vacuum station 10 of FIGURE 1, with, however, the polarity of the DC outputs of voltage supply 17 reversed and the circuit buildup 11 acting as a sputter process cathode. What had been cathode 18 for the previous processes now is an anode in the sputtering process circuit for removal of high sputtering rate metal from the circuit buildup as shown in FIGURE 2 to provide a resulting patterned circuit buildup 11', upon completion of a sputtering base film metal removal interval, to the condition as shown in FIGURE 3. In FIGURE 3, the base thin film is reduced to a tantalum patterned film remnant 13' as protected by the overcoating of aluminum 14 and remaining aluminum oxide $Al_2O_3$ 15'. Very little aluminum oxide is removed during the sputtering base film metal removing interval since its sputtering process removal rate is relatively low. This results in a well-defined remaining circuit pattern of base material 13' as a thin film circuit on substrate 12. After the circuit buildup 11' in the form as shown on FIGURE 3 is removed from the vacuum station, electrical contact may be made through the aluminum oxide $Al_2O_3$ to the bare aluminum and/or selective etching or machining of the aluminum oxide $Al_2O_3$ may be accomplished to expose various portions as desired of the retained tantalum thin film 13' so as to thereby provide electrical circuit elements such as resistors in such thin film circuitry. Such additional processing could also be a process step for the provision of capacitors with such thin film circuitry. This is with, for example, a portion of the aluminum oxide and aluminum removed and portions 15'' of aluminum oxide remaining and the corresponding subportions of aluminum 14' with a portion of the tantalum thin film layer 13' being a resistor between the two electrical contact areas provided by the remaining aluminum portions.

Thus, it may be seen that this invention provides an effective thin film circuit pattern forming process utilizing the selective sputtering rate characteristics of various metals and/or metal oxides in a vacuum station sputtering metal removing process that eliminates much, if not all, requirements for manual masking and/or corrosive etching processing. It should be noted that instead of using one vacuum station, such as the vacuum station 10 illustrated in FIGURE 1, with the attendant requirement for reversal of porality and interchangeability of cathode with anode, that multiple vacuum stations 10 may be employed in order, for example, to avoid contamination of what in one process step is a tantalum cathode and in another process step a sputtering process anode. An appropriate approach that has been tried successfully involves the use of a vacuum station with multiple stages and transport means for continuous processing movement of multiple thin film circuits from one station to another continuously during processing and from station to station through the vacuum station system.

Whereas this invention is here described with respect to various closely related process embodiments thereof, it should be realized that various process changes may be made without departing from the essential contributions to the art made by the teachings hereof.

I claim:

1. In the production of thin film circuitry, pattern forming of circuit films through selective removal of circuit thin film metal as determined by the different sputter rate of a plurality of materials and the patterns of original deposition and overlay of the materials; wherein at least two materials used in forming the circuit have different sputtering removal rates when submitted to sputtering as a cathode in a sputtering process circuit; the thin film circuit buildup being processed is positioned as a cathode in a sputtering process circuit and a voltage is applied for maintaining the sputtering process removal of metal from the circuit buildup for a process interval of time providing metal removal as desired; and wherein one of said materials is tantalum; and wherein another of said materials is aluminum.

2. The thin film production process of claim 1, including the previous deposition of tantalum on a substrate and including a patterned deposition of aluminum over tantalum.

3. The thin film production process of claim 2, wherein aluminum oxide is developed on the exposed surfaces of aluminum.

References Cited

UNITED STATES PATENTS

| | | | |
|---|---|---|---|
| 2,702,274 | 2/1955 | Law | 204—192 |
| 3,385,731 | 5/1968 | Weimer | 117—212 |
| 3,394,066 | 7/1968 | Miles | 204—164 |

ROBERT K. MIHALEK, *Primary Examiner.*

U.S. Cl. X.R.

117—212